(12) United States Patent
Miyazaki et al.

(10) Patent No.: US 10,527,874 B2
(45) Date of Patent: Jan. 7, 2020

(54) OPTICAL MODULATOR

(71) Applicant: SUMITOMO OSAKA CEMENT CO., LTD., Tokyo (JP)

(72) Inventors: Norikazu Miyazaki, Tokyo (JP); Kei Katou, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/090,276

(22) PCT Filed: Apr. 3, 2017

(86) PCT No.: PCT/JP2017/013875
§ 371 (c)(1),
(2) Date: Oct. 1, 2018

(87) PCT Pub. No.: WO2017/171094
PCT Pub. Date: Oct. 5, 2017

(65) Prior Publication Data
US 2019/0113778 A1 Apr. 18, 2019

(30) Foreign Application Priority Data
Apr. 1, 2016 (JP) .................................. 2016-073841

(51) Int. Cl.
*G02F 1/225* (2006.01)
*G02F 1/025* (2006.01)
(Continued)

(52) U.S. Cl.
CPC .............. *G02F 1/035* (2013.01); *G02F 1/011* (2013.01); *G02F 1/025* (2013.01); *G02F 1/225* (2013.01); *G02F 2001/212* (2013.01)

(58) Field of Classification Search
CPC .......... G02F 1/035; G02F 1/122; G02F 1/011; G02F 1/03; G02F 1/225; G02F 1/025; G02F 2001/212; G02B 6/4286; G02B 6/428
See application file for complete search history.

(56) References Cited

U.S. PATENT DOCUMENTS 7,151,866 B2   12/2006   Oikawa et al.

FOREIGN PATENT DOCUMENTS

JP   2005128185   5/2005
JP   2005128440   5/2005
(Continued)

OTHER PUBLICATIONS

"International Search Report (Form PCT/ISA/210)" of PCT/JP2017/013875, dated Jul. 4, 2017, with English translation thereof, pp. 1-4.

*Primary Examiner* — Thomas A Hollweg
*Assistant Examiner* — Erin D Chiem
(74) *Attorney, Agent, or Firm* — JCIPRNET

(57) ABSTRACT

An optical modulator is provided and includes a substrate that has an electro-optic effect, an optical waveguide that is formed on the substrate, a plurality of control electrodes that control a light wave propagated through the optical waveguide, and a plurality of light receiving elements that detect a light wave propagated through the optical waveguide. The optical modulator has two or more independent optical waveguide modulation portions. The light receiving elements are respectively provided in an upper part of the substrate with respect to the independent optical waveguide modulation portions. A wiring substrate is located above the substrate. A plurality of electric wirings are located on the wiring substrate. The plurality of electric wirings are disposed to extend in the vicinity of one side of the wiring substrate, are electrically connected to the light receiving (Continued)

elements, and output a signal detected by the light receiving elements to the outside.

13 Claims, 4 Drawing Sheets

(51) Int. Cl.
  *G02F 1/21* (2006.01)
  *G02B 6/42* (2006.01)
  *G02F 1/03* (2006.01)
  *G02F 1/035* (2006.01)
  *G02F 1/01* (2006.01)

(56) References Cited

FOREIGN PATENT DOCUMENTS

| | | |
|---|---|---|
| JP | 2009111194 | 5/2009 |
| JP | 2014197054 | 10/2014 |
| JP | 2015055669 | 3/2015 |
| JP | 2015197451 | 11/2015 |

OPTICAL MODULATOR

CROSS-REFERENCE TO RELATED APPLICATION

This application is a 371 application of the international PCT application serial no. PCT/JP2017/013875, filed on Apr. 3, 2017, which claims the priority benefits of Japan application no. 2016-073841, filed on Apr. 1, 2016. The entirety of each of the above-mentioned patent applications is hereby incorporated by reference herein and made a part of this specification.

TECHNICAL FIELD

The present invention relates to an optical modulator, and particularly relates to a wiring structure of a highly-integrated modulator such as a dual-wavelength integrated modulator.

BACKGROUND ART

While optical communication systems are progressively increased in speed and capacity, optical modulators used in the optical communication systems are progressively increased in performance and density. In addition, in order to meet the demands of miniaturization in optical modulators, miniaturization of substrates constituting an optical modulator is in progress as well. However, since the degree of freedom of wirings design is small due to the limitation on the substrate size, the wirings on the substrate are required to be improved in order to achieve high performance, high density, and miniaturization of the optical modulator.

In regard to wirings for such an optical modulator, inventions have been proposed as follows.

For example, Patent Literatures 1 to 3 each disclose a structure in which a substrate having an optical waveguide formed in the substrate and a substrate amplifying, relaying, and terminating a high-frequency signal for modulation overlap each other in a separated manner.

CITATION LIST

Patent Literature

Patent Literature No. 1: Japanese Laid-open Patent Publication No. 2005-128440

Patent Literature No. 2: Japanese Laid-open Patent Publication No. 2005-128185

Patent Literature No. 3: Japanese Laid-open Patent Publication No. 2015-55669

SUMMARY OF INVENTION

Technical Problem

Recently, highly-integrated optical modulators such as dual-wavelength integrated optical modulators have been developed. FIG. 1 illustrates an example of a configuration of dual-wavelength integrated dual polarization-quadrature phase shift keying (DP-QPSK) modulator in the related art. The optical modulator in FIG. 1 includes an optical waveguide modulation portion M1 to which a light wave having a wavelength $\lambda 1$ is input, and an optical waveguide modulation portion M2 to which a light wave having a wavelength $\lambda 2$ is input. These optical waveguide modulation portions M1 and M2 are configured to operate independently from each other.

On a substrate 1 having an electro-optic effect, each of the optical waveguide modulation portions M1 and M2 includes an optical waveguide 2, a control electrode 3 for controlling a light wave propagated through the optical waveguide 2, and a light receiving elements 4 for detecting a light wave propagated through the optical waveguide 2. The control electrode 3 includes a signal electrode 31 to which a high-frequency signal (modulation signal) is applied, a DC bias electrode 32 to which a DC voltage (bias voltage) is applied, and the like.

The optical waveguide 2 in each of the optical waveguide modulation portions M1 and M2 has a structure in which Mach-Zehnder waveguides are disposed in a multiplex nest type. Multiple control electrodes 3 or light receiving elements 4 are provided to correspond to the Mach-Zehnder waveguides. In FIG. 1, four signal electrodes 31, six DC bias electrodes 32, and two light receiving elements 4 are provided in each of the optical waveguide modulation portions M1 and M2.

A polarization-combining part 5 is disposed on a downstream side of the optical waveguide modulation portion M1, and the polarization-combining part 5 combines a light wave propagated through an output side arm portion of the Mach-Zehnder waveguide (main portion) and outputs the light wave to an optical fiber 6. The optical waveguide modulation portion M2 has a similar configuration. The polarization-combining part 5 has a structure in which polarization-combining is performed using a space optical system or a structure in which polarization-combining is performed using an optical waveguide.

As described above, in the highly-integrated optical modulator, multiple control electrodes 3 or light receiving elements 4 are provided on the substrate 1. Therefore, there is concern that electric wirings connected to these components may be complicated and electric crosstalk is occurred between the electric wirings if a line interval of the electric wirings is narrowed.

An object of the present invention is to provide an optical modulator having a simplified wiring structure of a substrate on which an optical waveguide is formed.

Solution to Problem

In order to achieve the object described above, an optical modulator of the present invention has technical features as follows.

(1) There is provided an optical modulator including a substrate that has an electro-optic effect, an optical waveguide that is formed on the substrate, a plurality of control electrodes that control a light wave propagated through the optical waveguide, and a plurality of light receiving elements that detect the light wave propagated through the optical waveguide. The optical modulator has two or more independent optical waveguide modulation portions. The light receiving elements are respectively provided in an upper part of the substrate with respect to the independent optical waveguide modulation portions. A wiring substrate is located above the substrate. A plurality of electric wirings are located on the wiring substrate. The plurality of electric wirings are disposed to extend in a vicinity of one side of the wiring substrate, are electrically connected to the light receiving elements, and output a signal detected by the light receiving elements to an outside.

(2) There is provided an optical modulator including a substrate that has an electro-optic effect, an optical waveguide that is formed on the substrate, a plurality of control electrodes that control a light wave propagated through the optical waveguide, and a plurality of light receiving elements that detect the light wave propagated through the optical waveguide. The optical modulator has two or more independent optical waveguide modulation portions. The light receiving elements are respectively provided in an upper part of the substrate with respect to the independent optical waveguide modulation portions. A wiring substrate is located above the substrate. The plurality of electric wirings are disposed to extend in a vicinity of both sides of the wiring substrate facing each other, are electrically connected to the light receiving elements, and output a signal detected by the light receiving elements to an outside.

(3) In the optical modulator according to (1) or (2), the independent optical waveguide modulation portions are configured on a plurality of substrates.

(4) In the optical modulator according to any one of (1) to (3), an electrode, which applies a DC voltage, of the control electrodes is electrically connected to the electric wiring formed on the wiring substrate.

(5) In the optical modulator according to any one of (1) to (4), a plurality of wiring substrates are provided.

Advantageous Effects of Invention

The optical modulator of the present invention has two or more independent optical waveguide modulation portions on the substrate. The light receiving elements are respectively provided on the substrate with respect to the independent optical waveguide modulation portions. The wiring substrate is located above the substrate. The plurality of electric wirings are located on the wiring substrate. The plurality of electric wirings are disposed to extend in the vicinity of one side of the wiring substrate or in the vicinity of both sides of the wiring substrate facing each other, are electrically connected to the light receiving elements, and output a signal detected by the light receiving elements to the outside. Thus, it is possible to provide an optical modulator having a simplified wiring structure of a substrate on which an optical waveguide is formed.

DESCRIPTION OF EMBODIMENTS

Hereinafter, an optical modulator according to the present invention will be described in detail.

Figure 2:
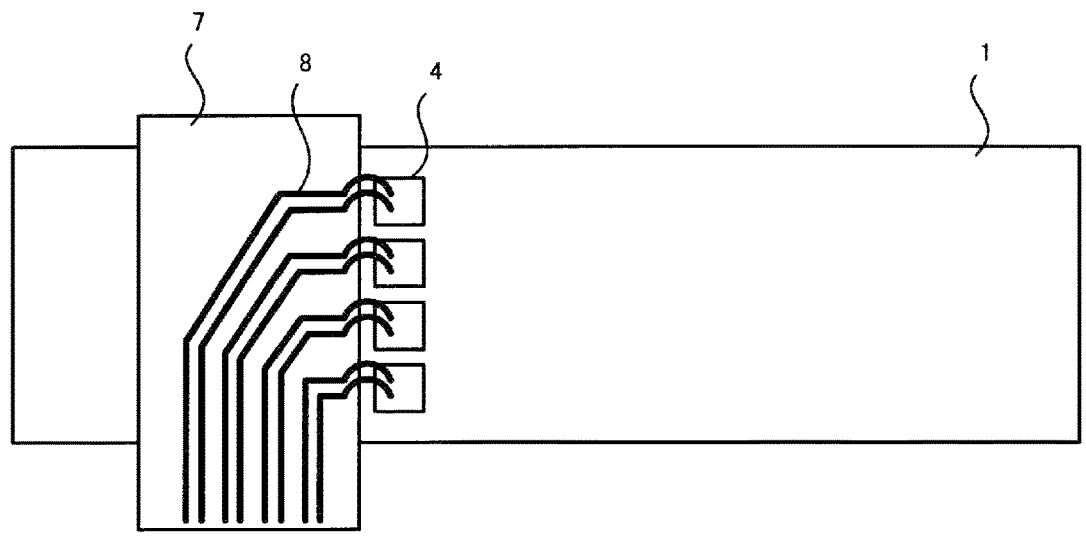
FIG. 2 is a plan view illustrating an optical modulator according to a first example of the present invention.
Figure 3:
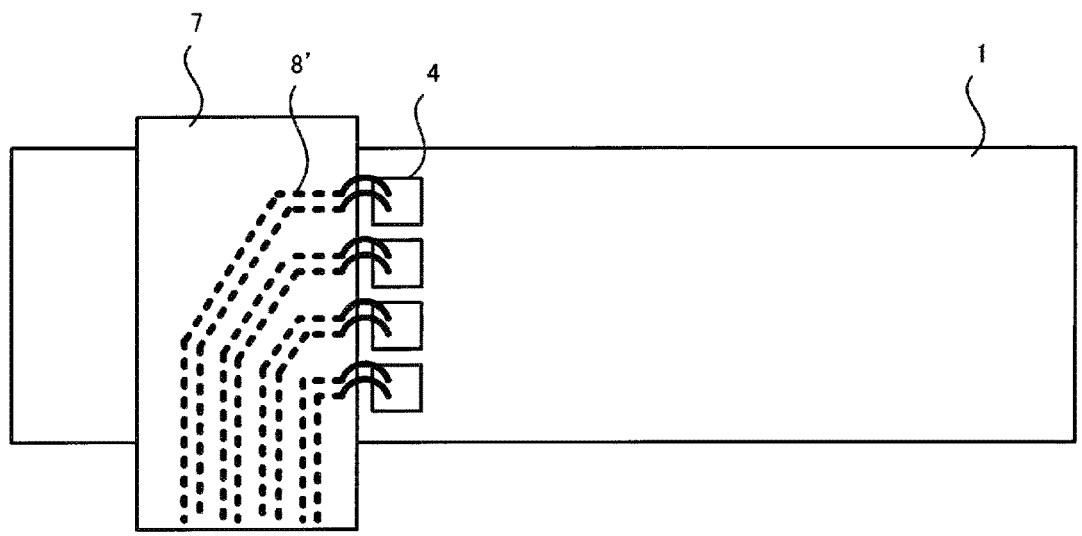
FIG. 3 is a plan view illustrating a modification example of the optical modulator according to the first example of the present invention.

For example, as illustrated in FIGS. 2 and 3, the optical modulator according to the present invention includes a substrate 1 that has an electro-optic effect, an optical waveguide 2 that is formed on the substrate 1, a plurality of control electrodes 3 that control a light wave propagated through the optical waveguide 2, and a plurality of light receiving elements 4 that detect a light wave propagated through the optical waveguide 2. The optical modulator has two or more independent optical waveguide modulation portions (M1 and M2). The light receiving elements 4 are respectively provided in an upper part of the substrate with respect to the independent optical waveguide modulation portions. A wiring substrate 7 is located above the substrate 1. A plurality of electric wirings 8 are located on the wiring substrate 7. The plurality of electric wirings 8 are disposed to extend in the vicinity of one side of the wiring substrate 7 or in the vicinity of both sides of the wiring substrate 7 facing each other, are electrically connected to the light receiving elements 4, and output a signal detected by the light receiving elements 4 to the outside.

As the substrate 1, any substrate may be employed as long as an optical waveguide can be formed in the substrate, such as quartz and a semiconductor. Particularly, it is possible to preferably utilize any single crystal of lithium niobate ($LiNbO_3$), lithium tantalate ($LiTaO_3$), and lead lanthanum zirconate titanate (PLZT), which is a substrate having an electro-optic effect.

For example, the optical waveguide 2 to be formed in the substrate 1 is formed by thermally diffusing a high refractive index substance such as titanium (Ti) on a $LiNbO_3$ substrate (LN substrate). In addition, it is also possible to utilize a rib optical waveguide in which grooves are formed on both sides of a part which will serve as an optical waveguide, or a ridge waveguide having a convex optical waveguide part. In addition, the present invention can also be applied to an optical circuit in which optical waveguides are respectively formed in waveguide substrates made of materials different from each other and these waveguide substrates are affixed and integrated together.

The substrate 1 is provided with the control electrodes 3 for controlling a light wave propagated through the optical waveguide 2. The control electrodes 3 include signal electrodes 31 constituting modulation electrodes, ground electrodes surrounding the signal electrodes 31, a DC bias electrode 32 applying a DC voltage, and the like. These control electrodes can be formed by forming electrode patterns of Ti and Au on a substrate surface and performing a gold plating method or the like. Moreover, as necessary, a buffer layer such as a dielectric substance ($SiO_2$) can be provided on the substrate surface after the optical waveguide is formed.

Figure 1:
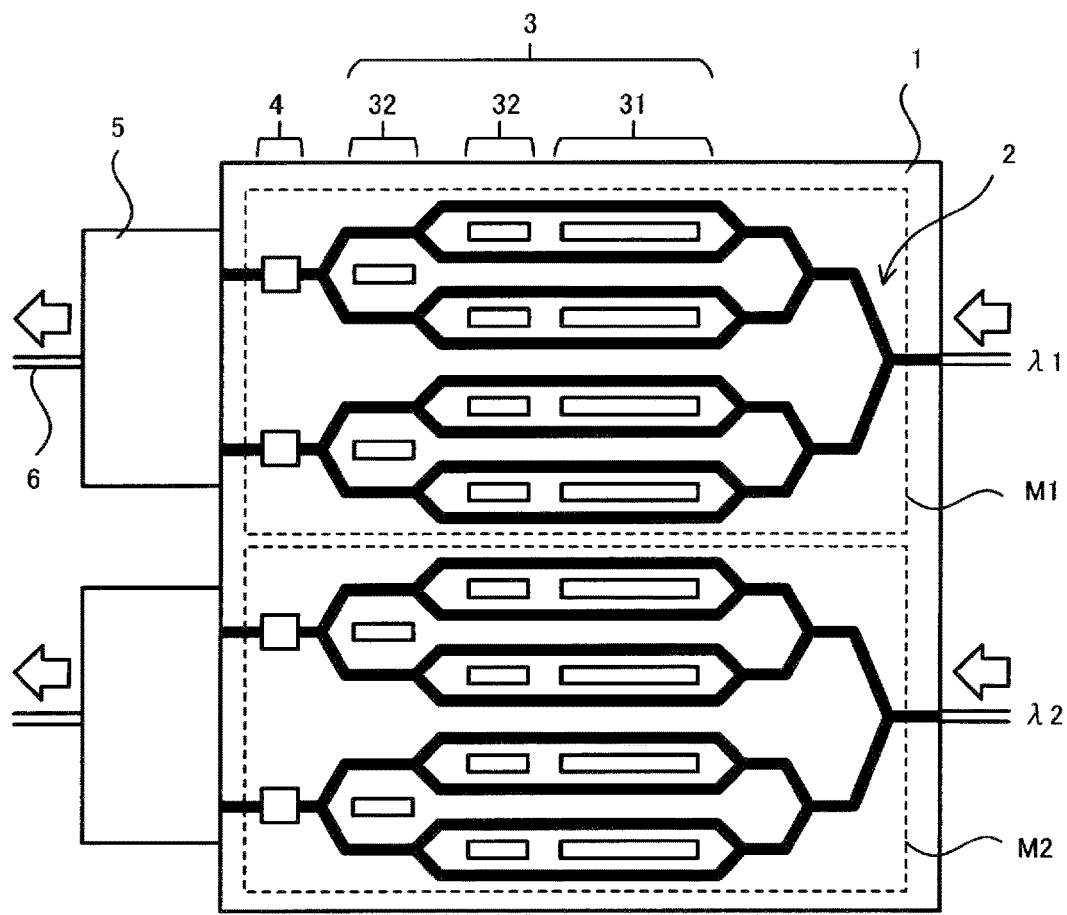
FIG. 1 is a plan view illustrating an example of a configuration of a dual-wavelength integrated DP-QPSK modulator in the related art.

The optical modulator according to the aspect of the present invention has two or more independent optical waveguide modulation portions and includes the optical waveguide modulation portions M1 and M2 as in FIG. 1, for example. In FIG. 1, the optical waveguide modulation portions M1 and M2 are provided in one substrate 1. However, two or more independent optical waveguide modulation portions may be respectively provided in substrates independent from each other.

As the main features of the optical modulator according to the present invention, the wiring substrate 7 is disposed above the substrate 1, and the electric wirings 8 electrically connected to the light receiving elements 4 on the substrate 1 are provided on the wiring substrate 7. Hereinafter, detailed description will be given with reference to examples.

EXAMPLE 1

FIG. 2 is a plan view illustrating an optical modulator according to a first example of the present invention.

In the optical modulator of the present example, the light receiving elements 4 are respectively provided in an upper part of the substrate 1 with respect to the independent optical waveguide modulation portions. In FIG. 2, four light receiving elements 4 are provided on the substrate 1. The wiring substrate 7 is disposed above the substrate 1 in an overlapping manner while being separated from the substrate 1. The four light receiving elements 4 on the substrate 1 are disposed to be arranged along one side of the wiring substrate 7. On the upper surface of the wiring substrate 7, the plurality of electric wirings 8 are disposed to extend in the vicinity of a side of the wiring substrate 7 along the arranged light receiving elements 4. An end portion of each of the electric wirings 8 on the above-described side of the wiring substrate 7 is electrically connected to the light receiving element 4 corresponding to the disposed position via a wire or the like. Each of the electric wirings 8 extends toward an other side of the wiring substrate 7 along a side surface of a housing (not illustrated) of the optical modulator, is electrically connected to an output pin of the housing, and outputs a signal detected by the light receiving elements 4 to the outside of the housing. The electric wiring 8 may be connected to the output pin via a different relay substrate.

In this manner, the electric wirings for transmitting a signal detected by the light receiving elements are formed on the wiring substrate disposed above the waveguide substrate, instead of the waveguide substrate on which the optical waveguide is formed. Therefore, the waveguide substrate can have a simplified wiring structure, and the substrate can also be reduced in size.

In addition, the line interval can be widened compared to a case where the electric wirings are disposed on the waveguide substrate, and a ground electrode can be disposed between the electric wirings. Accordingly, electric crosstalk between the electric wirings (crosstalk between signals detected by the light receiving elements) can also be effectively suppressed.

Moreover, the ground electrode may be disposed on the upper surface of the wiring substrate with each of the electric wirings interposed between the ground electrodes, or the ground electrode may be disposed to entirely cover the lower surface of the wiring substrate 7. Accordingly, the electric wirings can be shielded from a high-frequency signal leaking from the signal electrodes of the waveguide substrate, so that the high-frequency signal can be prevented from becoming noise in a signal detected by the light receiving elements.

In addition, the wiring and the ground electrode can be alternately disposed in layers using a multi-layer wiring substrate. In this case, electric crosstalk between the lines is further suppressed, and the electric shield against a leakage signal from the waveguide substrate can be more firmly realized.

Figure 4:
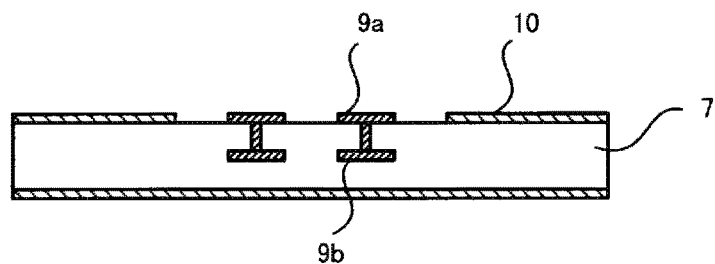
FIG. 4 is a cross-sectional view illustrating the modification example of the optical modulator according to the first example of the present invention.

FIG. 3 is a plan view illustrating a modification example of the optical modulator according to the first example of the present invention, and FIG. 4 is a cross-sectional view of the modification example of the optical modulator.

FIG. 3 illustrates a structure in which an electric wiring 9 passes through the inside of the wiring substrate 7. The electric wiring 9 includes a pad portion 9a on the upper surface of the wiring substrate 7 to which wires or the like leading to the light receiving elements 4 are connected, and an electric wiring 9b electrically connected to the pad portion 9a and passing through the inside of the wiring substrate 7. In this manner, the electric wirings for transmitting a signal detected by the light receiving elements 4 may be provided inside the wiring substrate 7. In addition, the wiring substrate 7 in FIG. 3 has a configuration in which the entire upper surface excluding a part near the pad portion 9a, and the entire lower surface are covered with a ground electrode 10, and the effect of shielding the electric wiring 9 is further enhanced.

EXAMPLE 2

Figure 5:
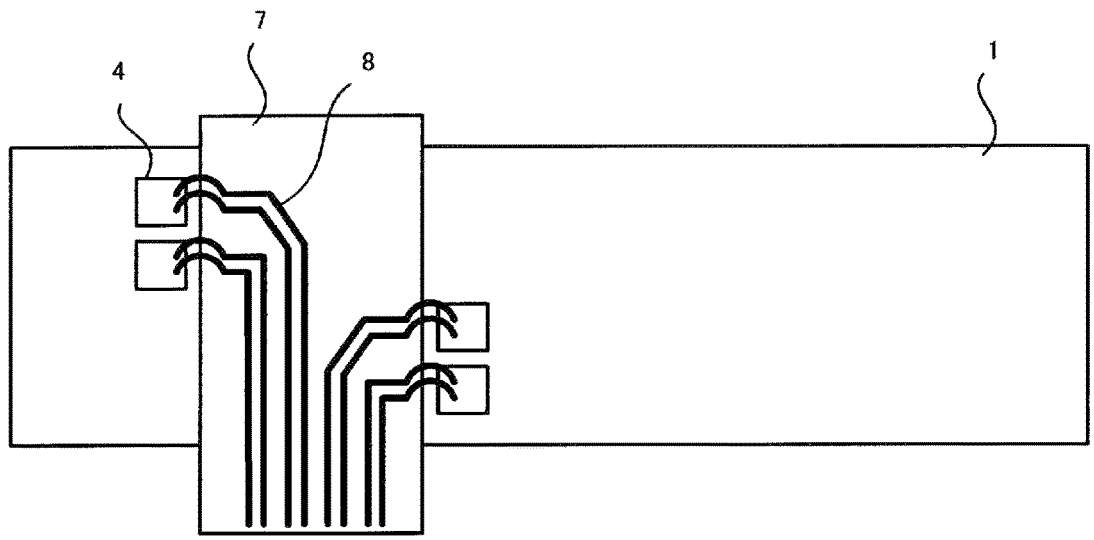
FIG. 5 is a plan view illustrating an optical modulator according to a second example of the present invention.

FIG. 5 is a plan view illustrating an optical modulator according to a second example of the present invention.

In the optical modulator of the present example, four light receiving elements 4 on the substrate 1 are disposed to be arranged along both sides of the wiring substrate 7 facing each other. For example, two light receiving elements 4 on a first optical waveguide modulation portion side are disposed along one side of both the sides, and two light receiving elements 4 on a second optical waveguide modulation portion side are disposed along the other side. On the upper surface of the wiring substrate 7, the plurality of electric wirings 8 are disposed to extend in the vicinity of both sides of the arranged light receiving elements 4.

Even in such a configuration, it is possible to achieve effects similar to those of the optical modulator according to the example described above. In addition, the light receiving elements related to the first optical waveguide modulation portion and the light receiving elements related to the second optical waveguide modulation portion differ from each other in the position of a light wave traveling direction. Therefore, the positions in the direction along both the sides can partially overlap each other, so that the width of the waveguide substrate in the direction can be reduced.

EXAMPLE 3

Figure 6:
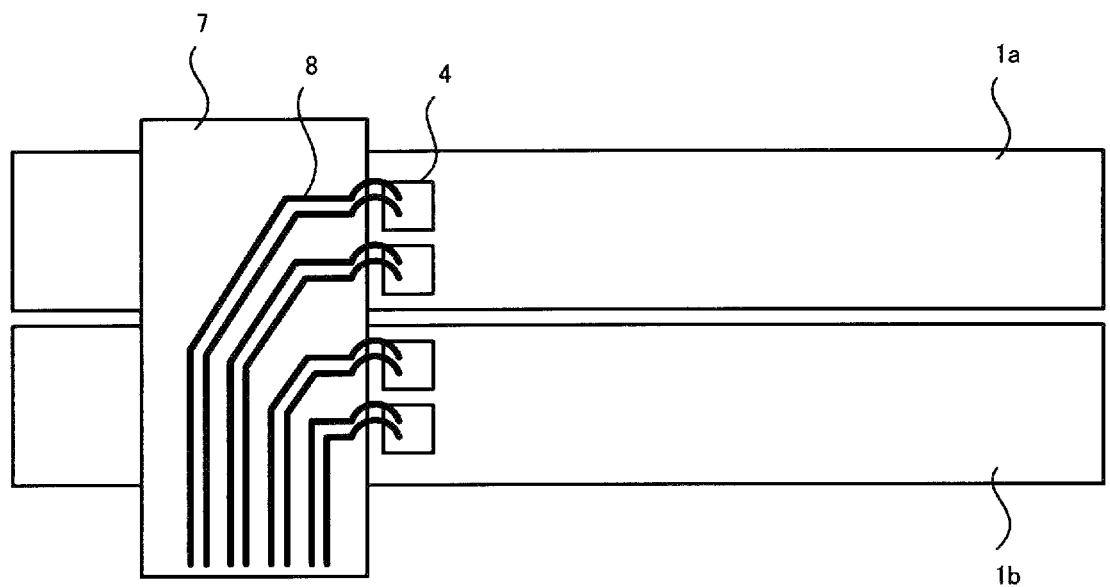
FIG. 6 is a plan view illustrating an optical modulator according to a third example of the present invention.

FIG. 6 is a plan view illustrating an optical modulator according to a third example of the present invention.

In the optical modulator of the present example, the independent optical waveguide modulation portions are configured on a plurality of waveguide substrates 1. That is, the first optical waveguide modulation portion is configured on a substrate 1a, and the second optical waveguide modulation portion is configured on a substrate 1b. In addition, two light receiving elements 4 are provided on the substrate 1a, and two light receiving elements 4 are provided on the substrate 1b. The substrates 1a and 1b are disposed to be arranged in the same plane as each other, and the wiring substrate 7 is disposed above the substrates 1a and 1b in an overlapping manner while being separated from the substrates 1a and 1b. In FIG. 6, four light receiving elements 4 on the substrates 1a and 1b are disposed to be arranged along one side of the wiring substrate 7, while as in Example 2, the light receiving elements 4 may be disposed to be arranged along both sides facing each other. On the upper surface of the wiring substrate 7, the plurality of electric wirings 8 are disposed to extend in the vicinity of one side (or both sides) along the arranged light receiving elements 4.

In this manner, the wiring structure of the waveguide substrate can be further simplified with the independent optical waveguide modulation portions being configured on a plurality of waveguide substrates. In addition, it is also possible to achieve an effect of enhancing the strength of the waveguide substrate compared to a case where a plurality of optical waveguide modulation portions are configured on one waveguide substrate.

EXAMPLE 4

Figure 7:
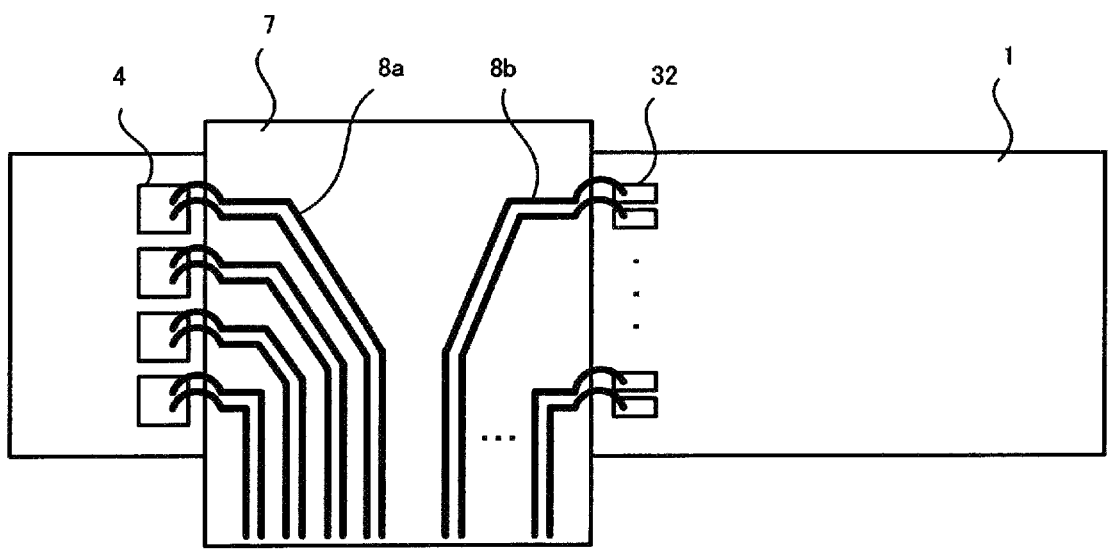
FIG. 7 is a plan view illustrating an optical modulator according to a fourth example of the present invention.

FIG. 7 is a plan view illustrating an optical modulator according to a fourth example of the present invention.

In the optical modulator of the present example, the plurality of light receiving elements 4 and a plurality of DC bias electrodes 32 on the substrate 1 are disposed to be arranged along both sides of the wiring substrate 7. In FIG. 7, the plurality of light receiving elements 4 are disposed along one side of both the sides, and the plurality of DC bias electrodes 32 are disposed along the other side. On the upper surface of the wiring substrate 7, a plurality of electric wirings 8a transmitting a signal detected by the plurality of light receiving elements 4 are disposed to extend in the vicinity of a side along the arranged light receiving elements 4. In addition, on the upper surface of the wiring substrate 7, a plurality of electric wirings 8b supplying a DC voltage to the plurality of DC bias electrodes 32 are disposed to extend in the vicinity of a side along the arranged DC bias electrodes 32.

In this manner, the wiring structure of the waveguide substrate can be further simplified when the DC bias electrodes applying a DC voltage are electrically connected to the electric wirings formed on the wiring substrate disposed above the waveguide substrate.

EXAMPLE 5

Figure 8:
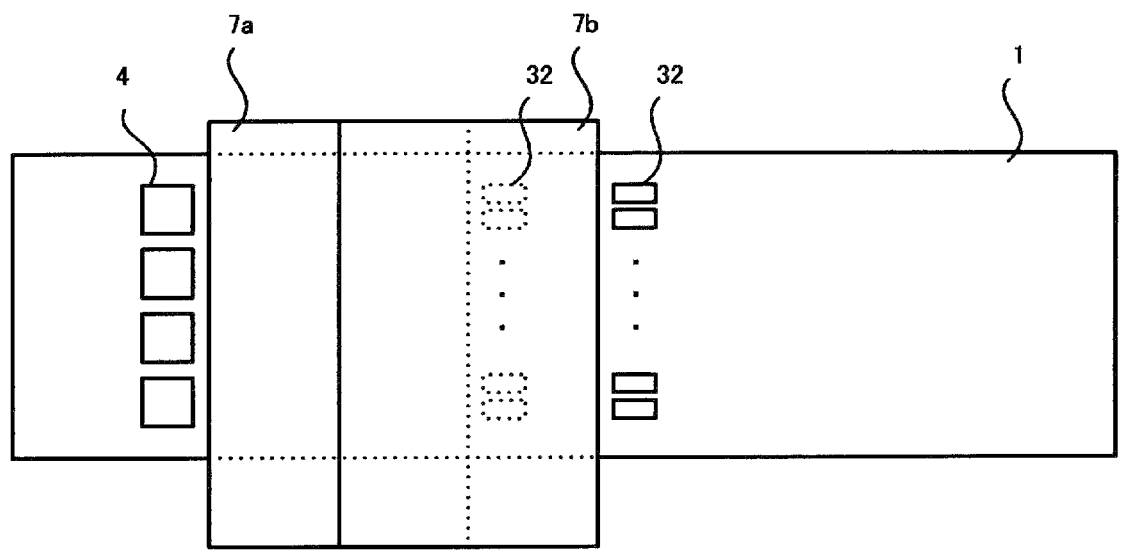
FIG. 8 is a plan view illustrating an optical modulator according to a fifth example of the present invention.
Figure 9:
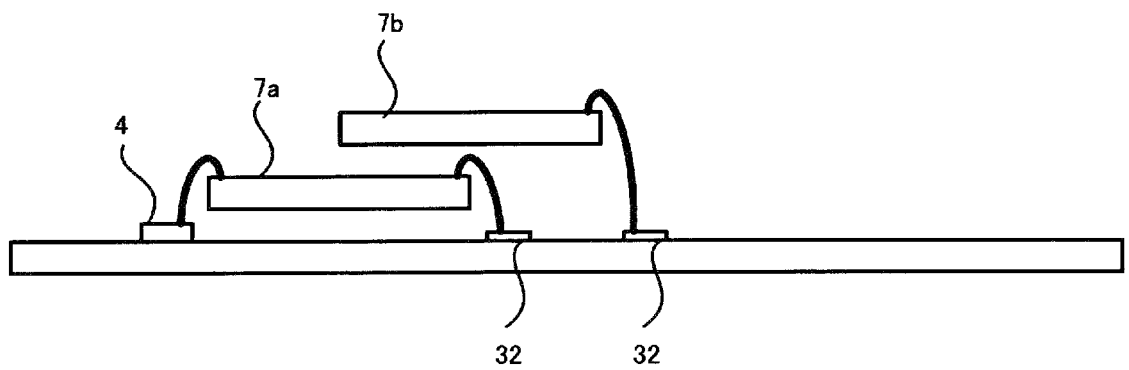
FIG. 9 is a side view illustrating the optical modulator according to the fifth example of the present invention.

FIG. 8 is a plan view illustrating an optical modulator according to a fifth example of the present invention, and FIG. 9 is a side surface of the optical modulator.

In the optical modulator of the present example, a plurality of wiring substrates 7 are provided. In FIG. 8, electric wirings (not illustrated) with respect to the light receiving elements 4 and electric wirings (not illustrated) with respect to a part of the DC bias electrodes 32 are disposed on a first wiring substrate 7a above the substrate 1. In addition, electric wirings (not illustrated) with respect to the remaining DC bias electrodes 32 are disposed on a second wiring substrate 7b above the first wiring substrate 7a.

A plurality of wiring substrates provided hierarchically can work even in a case where a sufficient space cannot be ensured with one wiring substrate since a number of light receiving elements or DC bias electrodes are provided. The wiring substrate may be divided in accordance with the types of electric wirings, such as a wiring substrate for electric wirings with respect to the light receiving elements, and a wiring substrate for electric wirings with respect to the DC bias electrodes.

Hereinabove, the present invention has been described based on the example. The present invention is not limited to the contents described above, and it is needless to mention that the design can be suitably changed within a scope not departing from the gist of the present invention.

It is possible to consider that the electric wirings with respect to the signal electrodes are disposed on the wiring substrate. However, it is difficult to apply this configuration because a high-frequency signal transmitted to the electric wirings with respect to the signal electrodes reaches a transmission symbol rate of 28 to 32 Gbaud at 100 Gbps, including an error correcting code such as FEC, for example. Therefore, as in the examples above, the present invention is applied to electric wirings for transmitting a signal having a relatively low frequency (1 GHz or lower), as the electric wirings with respect to the light receiving elements and the DC bias electrodes.

INDUSTRIAL APPLICABILITY

As described hereinabove, according to the present invention, it is possible to provide an optical modulator having a simplified wiring structure of a substrate on which an optical waveguide is formed.

The invention claimed is:

1. An optical modulator comprising:
   at least one substrate that has an electro-optic effect;
   an optical waveguide that is formed on the at least one substrate;
   a plurality of control electrodes that control a light wave propagated through the optical waveguide, and
   a plurality of light receiving elements that detect the light wave propagated through the optical waveguide,
   wherein
   the optical modulator includes a plurality of optical waveguide modulation portions which is independent and arranged in parallel, and light waves with a plurality of different wavelengths is respectively input to the optical waveguide modulation portions,
   the optical waveguide in each of the optical waveguide modulation portions includes a nest optical waveguide in which Mach-Zehnder waveguides are disposed in a nest type, and the nest optical waveguide is provided in each of two branched waveguides branched from one input portion,
   the light receiving elements are respectively provided, in an upper part of the at least one substrate at a place subsequent to the nest optical waveguide in a propagation direction of the light wave, for each of the branched waveguides,
   at least one wiring substrate is located above the at least one substrate,
   the at least one wiring substrate is formed with a plurality of electric wirings which is electrically connected to all of the light receiving elements, and separately outputs a signal detected by the light receiving elements to an outside.

2. The optical modulator according to claim 1, wherein the plurality of electric wirings are disposed to extend along only one side of the at least one wiring substrate or along both sides of the at least one wiring substrate facing each other.

3. The optical modulator according to claim 2,
   wherein the at least one substrate comprises plural substrates, and
   each of the optical waveguide modulation portions is respectively configured on the substrate.

4. The optical modulator according to claim 2,
   wherein an electrode, which applies a DC voltage, of the control electrodes is electrically connected to the electric wiring formed on the at least one wiring substrate.

5. The optical modulator according to claim 2,
wherein the at least one wiring substrate comprises a plurality of wiring substrates.

6. The optical modulator according to claim 1,
wherein the at least one substrate comprises plural substrates, and
each of the optical waveguide modulation portions is respectively configured on the substrate.

7. The optical modulator according to claim 6,
wherein an electrode, which applies a DC voltage, of the control electrodes is electrically connected to the electric wiring formed on the at least one wiring substrate.

8. The optical modulator according to claim 6,
wherein the at least one wiring substrate comprises a plurality of wiring substrates.

9. The optical modulator according to claim 1,
wherein an electrode, which applies a DC voltage, of the control electrodes is electrically connected to the electric wiring formed on the at least one wiring substrate.

10. The optical modulator according to claim 9,
wherein the at least one wiring substrate comprises a plurality of wiring substrates.

11. The optical modulator according to claim 1,
wherein the at least one wiring substrate comprises a plurality of wiring substrates.

12. The optical modulator according to claim 1, wherein
in the electrical wirings of the at least one wiring substrate, in order to suppress crosstalk between the electrical wirings, a line interval between adjacent electrical wirings is widened or a ground electrode is disposed between the adjacent electrical wirings.

13. The optical modulator according to claim 1, wherein a ground electrode is provided on an upper surface or a lower surface of the at least one wiring substrate, and the electrical wirings are shielded from a high-frequency signal outside the at least one wiring substrate.

* * * * *